US005466905A

United States Patent [19]

Flowers et al.

[11] Patent Number: 5,466,905
[45] Date of Patent: Nov. 14, 1995

[54] LOW ELECTRIC D.C., LOW TIME RATE POLARITY REVERSING ARC WELDING METHOD

[75] Inventors: Gilbert E. Flowers; Joel H. Cohen, both of Cincinnati; Earl L. Kelly, Jr., West Chester; Levi Williams, Milford, all of Ohio; Gray W. Grubbs, Burlington, Ky.

[73] Assignee: General Electric Company, Cincinnati, Ohio

[21] Appl. No.: 223,199

[22] Filed: Apr. 5, 1994

[51] Int. Cl.$^6$ .................................................. B23K 10/00
[52] U.S. Cl. .............................. 219/121.46; 219/121.44; 219/130.5; 219/121.59
[58] Field of Search ........................ 219/130.51, 130.4, 219/137 PS, 121.54, 121.56, 121.57, 121.46, 121.44, 76.15, 76.16, 75, 121.59

[56] References Cited

U.S. PATENT DOCUMENTS

| | | | |
|---|---|---|---|
| 3,071,678 | 1/1963 | Neely et al. | 219/76 |
| 3,591,759 | 7/1971 | Stand | 219/76 |
| 3,598,954 | 8/1971 | Iceland et al. | 219/131 R |
| 3,781,508 | 12/1973 | Dauer et al. | 219/121 P |
| 4,125,754 | 11/1978 | Wasserman et al. | 219/121 P |
| 4,142,089 | 2/1979 | Lau et al. | 219/121 |
| 4,472,619 | 9/1984 | Ueda et al. | 219/76.15 |
| 4,621,183 | 11/1986 | Takeuchi et al. | 219/121 PL |
| 4,672,171 | 6/1987 | Cusimano et al. | 219/121 PM |
| 4,689,463 | 8/1987 | Shubert | 219/76.16 |
| 4,739,146 | 4/1988 | Lindland et al. | 219/121 PY |
| 4,745,256 | 5/1988 | Shubert | 219/121 PL |
| 4,808,055 | 2/1989 | Wertz et al. | 416/224 |
| 4,822,248 | 4/1989 | Wertz et al. | 416/192 |
| 4,878,953 | 11/1989 | Saltzman et al. | 148/4 |
| 4,904,843 | 2/1990 | Hori et al. | 219/137 PS |
| 4,928,879 | 5/1990 | Rotolico | 239/8 |
| 4,947,021 | 8/1990 | Stava | 219/130.51 |
| 4,990,739 | 2/1991 | Zaplatynsky | 219/121.47 |
| 5,021,629 | 6/1991 | Shimomura | 219/121.59 |
| 5,148,986 | 9/1992 | Rusch | 239/85 |
| 5,220,151 | 6/1993 | Terayama et al. | 219/130.32 |
| 5,264,679 | 11/1993 | Martin | 219/130.4 |
| 5,349,159 | 9/1994 | Mita et al. | 219/137 PS |

*Primary Examiner*—Mark H. Paschall
*Attorney, Agent, or Firm*—Andrew C. Hess; David L. Narciso

[57] ABSTRACT

Direct electric current arc welding between an electrode and a workpiece surface is accomplished in the electric current range of about 0.5–45 amps while reversing the polarities between the electrode and the workpiece surface at a low frequency rate in the range of about 1–1000 cycles per second, in a series of polarity cycles. The workpiece surface, in at least some of the cycles, is positive for a time less than that surface is negative to result in anodic cleaning of the workpiece surface. If the arc is extinguished during a polarity reversal, the arc is maintained, for example, by restriking.

8 Claims, 2 Drawing Sheets

LOW ELECTRIC D.C., LOW TIME RATE POLARITY REVERSING ARC WELDING METHOD

BACKGROUND OF THE INVENTION

This invention relates to electric arc welding and, more particularly, to a method for providing scheduled variable polarity direct electric current between an electrode and a workpiece surface.

A variety of direct current (D.C.) electric arc welding methods and apparatus have been reported. As they relate to a form of the present invention, those describing D.C. plasma transferred arc methods and apparatus are of interest. In a typical arrangement, a form of surfacing using D.C. plasma arc welding has been described in U.S. Pat. No. 4,125,754—Wasserman (patented Nov. 14, 1978). In that patent, a plasma arc is generated between a non-consumable electrode always as negative and a workpiece always as positive, while powder is introduced into the plasma arc and carried toward the workpiece. In U.S. Pat. No. 4,689,463—Shubert (patented Aug. 25, 1987), that same general arrangement maintains the electrode always as negative and the workpiece always as positive while pulsing, periodically, the current between a main current level and a lower, auxiliary current level.

Still another arrangement, related to and a modification of the above Shubert patent, is shown in U.S.Pat. No. 4,739,146—Lindland and Shubert (patented Apr. 19, 1988). In the '146 patent, the pulsing current of the '463 patent is pulsed or switched at a high frequency, (compare FIG. 1 of each of those patents), for example about 15,000 cycles per second. Allegedly this is done to stabilize the current and to obtain a more effective power output for a given amperage input.

All of the above identified, and similar, D.C. arrangements are known in the art as straight polarity D.C. methods and apparatus because, throughout operation, the polarity of the electrode remains the same polarity, as does the polarity of the workpiece surface. The disclosures of each of the above identified patents are hereby incorporated herein by reference for background purposes and to show typical reported arrangements.

SUMMARY OF THE INVENTION

The present invention, in one form, defines a method in which a low amperage D.C. electric arc is provided between an electrode and an electrically conductive workpiece surface wherein the electrode is at a first electric polarity and the workpiece surface is at a second electric polarity opposite to the first electric polarity, in the low current range of about 0.5–45 amps. Then the electric polarities are reversed, in that current range, between the electrode and the workpiece surface to define a polarity cycle. Thereafter, the reversing of the polarities is repeated in a preselected pattern at a low frequency in the range of about 1–1000 cycles per second (cps) to establish a series of polarity cycles in at least some of which the workpiece surface polarity is positive for a first period of time which is less than a second period of time during which the polarity of the workpiece surface is negative, while maintaining the arc between the electrode and the workpiece surface. Practice of this method results in a lower heat input to the workpiece surface thereby reducing any heat affected zone, and more efficient power utilization. In addition, it results in the occurrence of anodic cleaning of the workpiece surface when the polarity of the workpiece surface is positive.

In another form, the method of this invention includes maintaining the arc by regenerating or restriking the arc between the electrode and the workpiece surface when the arc is extinguished as a result of reversing polarities in a cycle at a low current flow in the range of about 0.5–45 amps and at the low frequency rate of reversal in the range of about 1–1000 cps.

DESCRIPTION OF THE PREFERRED EMBODIMENTS

The present invention is particularly useful with Fe, Ni, or Co base superalloys in a D.C. plasma transferred arc method in which a powder is disposed in the arc for transport to a workpiece surface for deposit thereon or interaction therewith. It will be recognized, however, that the present invention can be used for welding members without powder or with a consumable electrode.

Generally when powder is used, the powder is at least partially melted in the arc and generally is fused with or metallurgically bonded to a workpiece surface. When the workpiece surface is relatively thin or sensitive to heat, it is desirable, and generally necessary, to use the minimum electric current required to accomplish the fusion or bonding in order to avoid burning through a thin member or creating an undesirable heat affected zone adjacent the deposit.

The present invention combines use of a low direct electric current arc and low cycle polarity reversal between a main electrode and a workpiece surface, alone or in combination with an additional deposited material, such as a powder, to minimize heat input to a workpiece surface while accomplishing the desired welding-type operation. At the same time, periodic anodic cleaning of the workpiece surface is accomplished to provide a cleaner weld or surface. These benefits are brought about as a result of reversing polarities between positive and negative of an electrode and the workpiece surface at a low cycle rate in the range of about 1–1000 cps at a low D.C. in the range of about 0.5–45 amps. During at least some of such cycles, the workpiece surface is positive for anodic cleaning and to reduce heat input to the workpiece surface for a first period of time less than a second period of time during which the workpiece surface is negative. In this way, in a low current flow range and at a low reversal cycle rate, more efficient power utilization results, a smaller diameter electrode can be used for desired penetration, and a cleansing action on the workpiece surface takes place as electrons escape through surface oxides. This combination of welding conditions in a pattern preselected for the material and configuration of the workpiece surface provides the cleaner weld condition, with more uniform penetration and a smaller heat affected zone in the material adjacent the weld or build-up.

As used herein, the term "workpiece" or "workpiece surface" is intended to include not only the initial surface of the workpiece at the start of operation, but also each subsequent weld or deposit upon which the electric arc interacts in multiple pass methods for welding or deposit build-up. Thus, such newly generated surface becomes the workpiece or workpiece surface in respect to a subsequent operation.

Figure 1:
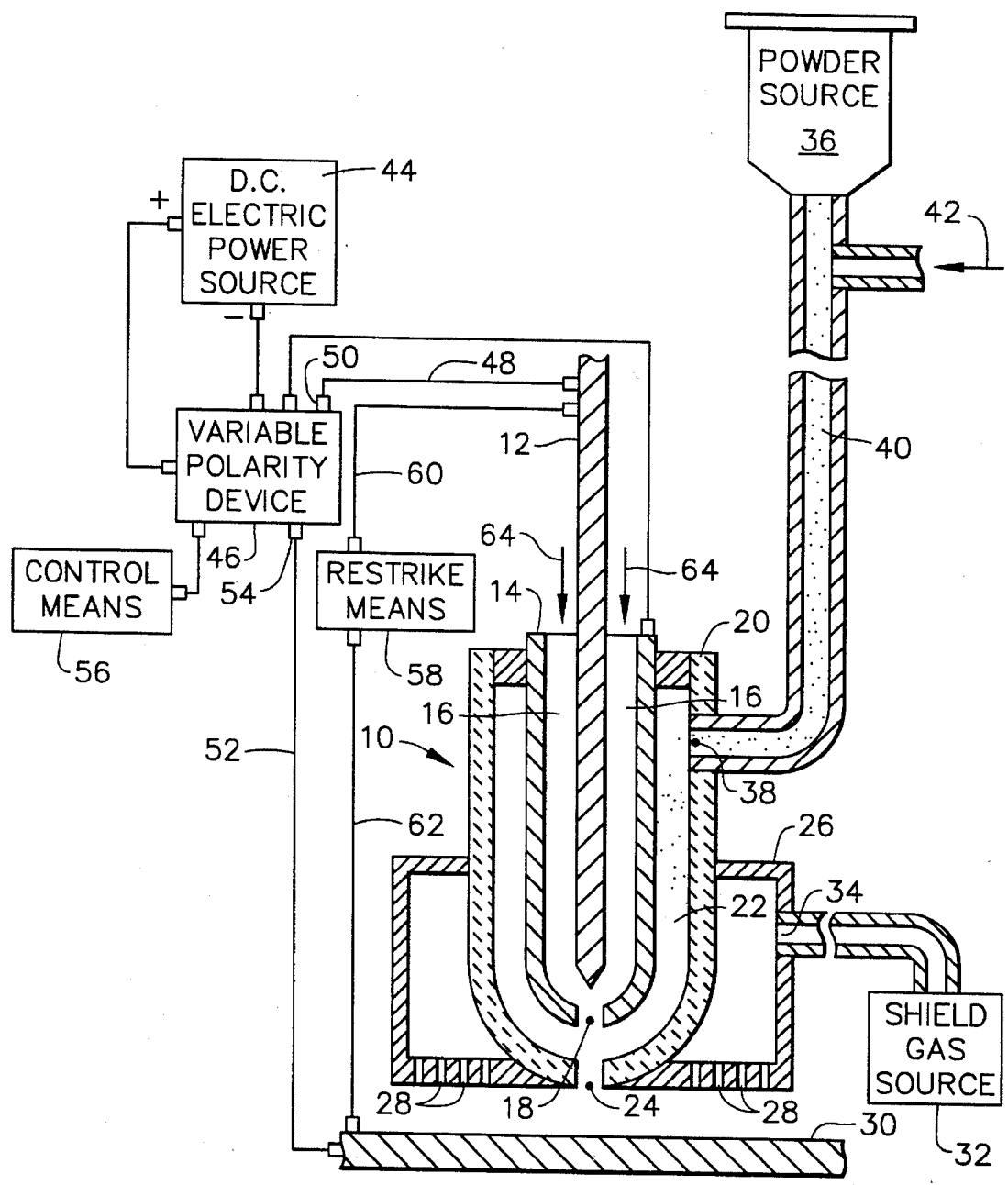
FIG. 1 is a diagrammatic, schematic view of one form of electric arc welding apparatus adapted to practice the present invention.

One example of apparatus associated with the present invention is shown in the diagrammatic, schematic presentation of FIG. 1. A typical D.C. plasma transferred arc nozzle assembly is shown generally at 10. In the assembly of that embodiment, a non-consumable main electrode 12, of a type generally used in the art, is surrounded by a secondary or pilot electrode 14 spaced apart from electrode 12 to define a passage 16 therebetween. An opening 18 in electrode 14 is opposite a tip of electrode 12 as shown in FIG. 1. Disposed outwardly about and spaced apart from secondary electrode 14 is an electrically non-conductive guide member 20, for example of a ceramic, defining a passage 22 between member 20 and secondary electrode 14, and including an opening 24 generally aligned with opening 18. A shield gas manifold 26 is disposed about and in contact with ceramic guide member 20, as shown, and includes gas exit ports 28 directed generally at a workpiece surface 30. During operation, a shield gas, for example argon, is supplied to the interior of manifold 26 from a shield gas source 32, through a port 34 in the manifold and subsequently through ports 28 to cover workpiece surface 30.

Associated with the nozzle assembly 10 is a powder source 36 connected through a port 38 to passage 22 between secondary electrode 14 and ceramic guide member 20. Powder flow from source 36 through conduit 40 is enhanced by a powder carrier gas, for example argon, represented by arrow 42 from a gas source (not shown). One commercially available powder delivery assembly useful in the type of arrangement shown in FIG. 1 is marketed by Eutectic Corp. as Model 5300LF fluidized bed powder feeder.

The type of nozzle assembly and its associated apparatus shown in FIG. 1 is typical of that shown in the above incorporated patents. A typical welding torch of the type shown is commercially available, for example, a Mu-Weld Plasma Torch Model No. 548979, marketed by Ferranti-Sciaky, Inc., Chicago, Ill. In that model, the inert gas shielding passage within the torch is used as a conduit for delivery of a low-flow carrier gas and powdered filler material to the plasma column of the torch. Over the plasma orifice piece is threaded a powder focusing nozzle which provides a powder stream flow that is concentric with the plasma column. The powder flow mixes with the plasma column to form a stream of molten filler particles that are delivered to the substrate.

Although a D.C. electric power source such as 44 in FIG. 1 has been associated generally with the above described apparatus, unique to the present invention is the improvement of a low current flow (about 0.5–45 amps), low frequency cycle (about 1–1000 cps) variable polarity device 46 connected between D.C. electric power source 44 and the combination of main electrode 12 and workpiece surface 30. Main electrode 12 is connected through conductor 48 to terminal 50 of device 46 and workpiece 30 is connected through conductor 52 to another terminal, 54, of device 46. Electric D.C. power from source 44 is dispersed from variable polarity device 46 in a reversing polarity cycle between main electrode 12 and workpiece 30 as scheduled by control means 56. Conveniently, variable polarity device 46 includes an arc striking means, otherwise generally associated with the D.C. electric source 44, to strike an arc between main electrode 12 and workpiece surface 30 at the start of a welding operation.

Variable polarity devices for use particularly in the plasma welding of aluminum or alloys of aluminum are commercially available for operation at high electric current levels, for example, greater than 50 amps and generally in the range of about 200–300 amps. For example, one such device is marketed by Venable Industries, Inc. as the Pulseweld TIG/Plasma welding system. However, the present invention specifies use of a variable polarity device operating at a low current flow in the range of about 0.5–45 amps, along with a low frequency of polarity reversal between the electrode and the workpiece surface in the range of about 1–1000 cps to minimize heat input to the workpiece surface, to provide anodic cleaning of such surface, and to utilize more efficiently the electric power required to provide the desired welding function.

Frequently, when the welding operation of the present invention is conducted in the lower portions of the above described ranges, the arc between the main electrode and the workpiece surface can be extinguished during polarity reversal. One form of the present invention includes provision of an arc regeneration or restrike capability in combination with the variable polarity operation, as described above. With reference to FIG. 1, such a restrike capability is represented by restrike means 58 which maintains the arc by regeneration, such as a result of sensing conditions between the main electrode and the workpiece surface. Restrike means 58, in FIG. 1, is connected by a conductor 60 to main electrode 12 and by a conductor 62 to workpiece surface 30. In one embodiment, restrike means 58 senses the current flow between main electrode 12 and workpiece surface 30. If the arc therebetween is extinguished or non-existent, current flow drops and a capacitor discharge, for example in the range of about 5,000–20,000 volts, is initiated by restrike means 58 to restrike or regenerate the arc.

During one form of operation of the present invention, a plasma gas represented by arrows 64 from a typical source (not shown), for example argon gas or an argon—5–7 vol. % hydrogen gas mixture, is introduced into passage 16 between main electrode 12 and secondary electrode 14. A pilot arc first is initiated between those electrodes and then transferred through plasma gas 64 to workpiece surface 30. Generally the pilot arc conveniently is maintained during the entire operation. Because the polarities of the main electrode and the workpiece surface are reversed during operation in accordance with the present invention, operation can be initiated with the main electrode either positive or negative and the workpiece surface at the opposite polarity.

Powder flowing through passage 22 is introduced into the transferred arc between openings 18 and 24 in FIG. 1 for interaction with the arc, such as complete or partial melting. The powder is propelled in the plasma arc toward and into contact with workpiece surface 30 through opening 24 in ceramic guide member 20.

Figure 2:
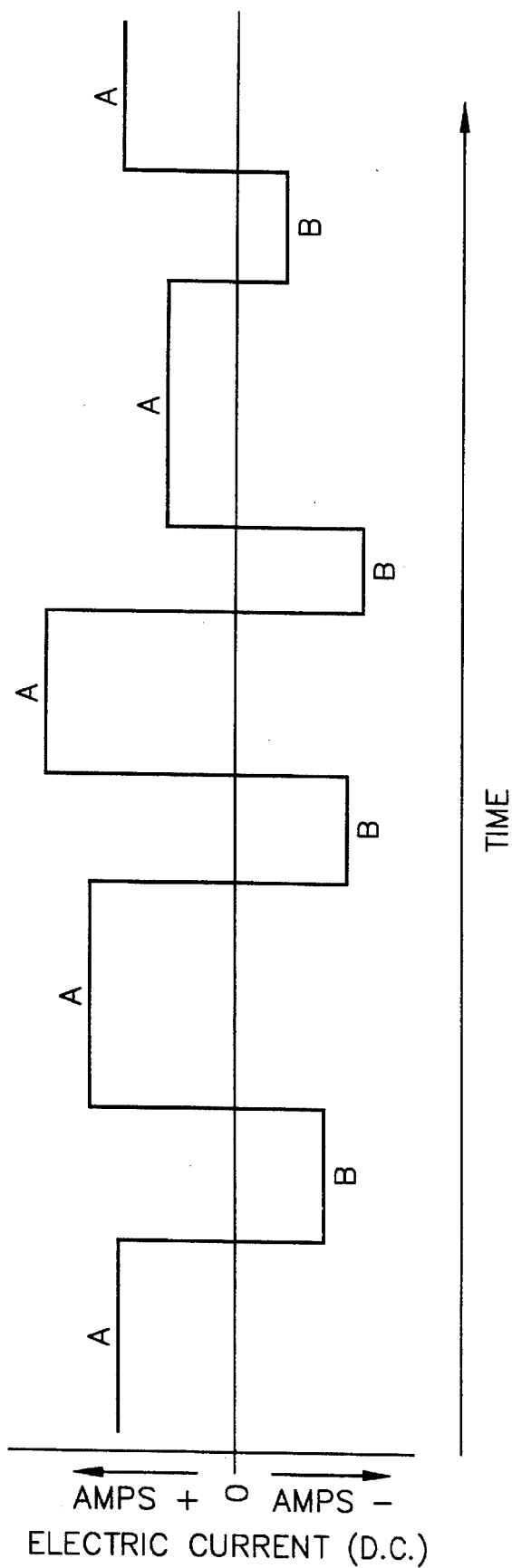
FIG. 2 is a graphical presentation of a series of variable D.C. polarity cycles showing electric current verses time in respect to the polarity of the main electrode.

As was mentioned above, during practice of the present invention, the polarity of the workpiece surface, in at least some of the cycles, is positive for anodic cleaning and for heat input reduction for a first period of time less than a second period of time in which that surface is negative. A graphical presentation of one series of such variable D.C. polarity cycles is shown in the presentation of FIG. 2, comparing D.C. electric current flow with advancing time. FIG. 2 shows the cycles in respect to the positive or negative polarity of the main electrode, it being understood that the polarity of the workpiece surface would be of the opposite polarity. For example, in FIG. 2 the line segment A indicates the relative current level and time period at which the main electrode 12 in FIG. 1 is positive (and the workpiece surface 30 is negative). The line segment B indicates the relative current level and time period at which the main electrode is negative (and the workpiece surface is positive). As was stated above, because the polarities are reversed between positive and negative, operation can start at any point in the predetermined, scheduled cycles.

The form and extent of the polarity cycles are maintained by a Variable Polarity device 46 in FIG. 1 based on the type of material and the geometry (for example, size, thickness, etc.) of the workpiece or workpiece surface, initially and as deposition or welding progresses. The Variable Polarity device, a Variable Polarity Power Supply, creates an A.C. current from a D.C. supply. It consists of an interface board and invertor control board, eight IGBT (Insulated Gate Bipolar Transistors) driver boards, and eight IGBT's.

The IGBT's and driver boards are wired to provide reverse current (direct current—electrode positive). The Invertor Control Board alternatively turns the straight and reverse current drivers on and off at the appropriate frequency and duty cycle. In this way, the Variable Polarity Power Supply produces pulse width modulated A.C.

The operating conditions for each workpiece or workpiece surface are predetermined, such as in the type of examples included below, and included in control means 56 using instruments and devices commercially available and used in the art, for example in the above identified commercially available variable polarity device. Control means 56 and variable polarity device can be included in the same instrument or box.

In FIG. 2, it should be noted that line segments B are shorter along the time axis than are line segments A in any cycle, even though line segments A and line segments B can vary in length among themselves. Also, the current levels for line segments A and for line segments B, shown along the electric current axis, can vary as desired and predetermined.

One typical series of examples during evaluation of the present invention involved use of a Ni-base superalloy workpiece of a commercially available alloy identified as Hastalloy X alloy in a workpiece thickness of about 0.045 inch. The plasma gas and the shield gas both were argon. The powder used was, for the nickel-base superalloy, INCO-718, In that series of examples, line segment A was about 0.20 second and was about 9 times the length of line segment B which represented the reversed current or positive polarity of the workpiece. The current levels in that series, for the main electrode, were 4.0 amps on the positive side and 1.5 amps on the negative side. The time periods for the main electrode was 0.20 second positive, and 0.022 second negative. In respect to the workpiece in that series, the reverse polarities existed for the one-ninth time periods stated above and at the same current levels. Similar results are expected for cobalt-base superalloys when a powder such as FSX-414 is used.

During evaluation of this invention, it was observed that for a workpiece in the form of a foil of about 0.005" thick, an arc can be maintained through polarity reversal and restrike at as low as about 0.2 amps. In addition, evaluations were conducted on Fe, Ni, and Co base alloys commercially available and identified as IN-718, A-286, AISI 321 stainless steel, FSX-414 and GTD-222 alloys with current reversal generally in the range of about 5–30 cps.

When the workpiece was positive, a cleansing action took place at the workpiece surface (including at the surface of subsequent deposits), as electrons escape through surface oxides. Surface contamination can occur during operation, for example, resulting from workpiece surface conditions, impurities in the gases used, turbulent mixing of the ambient atmosphere about the deposit (sometimes called windage), etc. Practice of the present invention at the low current levels of about 0.5–45 amps and low polarity reversing cycles of about 1–1000 cps reduces, significantly, the heat energy required to electrically deposit a material or weld a surface.

In the practice of the present invention, it is convenient to use the "square wave" type form shown in FIG. 2 for still lower power input. However, other shape waves can be used within the scope of this invention. Because the present invention operates in the low current range of about 0.5–45 amps at polarity reversing cycles in the range of about 1–1000 cps, regeneration of the plasma arc generally is required, particularly in the low reversing cycle range of up to about 30 cps. Operation in the higher cycle range approaching 1000 cps, the weld pool may have enough ionization frequently to restrike spontaneously. The present invention, in one form, provides continual restrike capability, particularly for operation in such lower ranges, to assure quality and uniformity of operation. Continual maintenance of the arc is especially important because powder, when used, continues to flow during any potential plasma arc interruption or extinguishment at polarity reversal. Without restrike assurance, particularly in such lower ranges, unmelted or inadequately heated powder could deposit in the weld area, resulting in a non-uniform deposit.

Through practice of the present invention, lower levels of power are required to weld or deposit a material on a workpiece surface. This results in generation of less heat at the workpiece surface and, accordingly, a smaller heat affected zone in the workpiece. The lower power level enables use of a smaller diameter main electrode. The invention also results in a cleaner weld deposit and uniform penetration. The present invention has been described, for convenience, in connection with specific embodiments and examples which are intended to be typical of rather than in any way limiting on the scope of this invention. It will be recognized by those skilled in the arts involved that the invention is capable of variations and modifications without departing from scope of the appended claims.

We claim:

1. In a method in which a direct current electric arc is provided between an electrode and an electrically conductive workpiece surface, the steps of:

providing the electrode with a first electric polarity and the workpiece surface with a second electric polarity opposite the first electric polarity in a low electric current range of about 0.5–45 amps;

reversing the electric polarities between the electrode and the workpiece surface, in said electric current range;

again reversing the electric polarities between the electrode and the workpiece surface in said electric current range to provide the electrode with said first electric polarity and the workpiece surface with said second electric polarity opposite said first electric polarity to define a polarity cycle; and, repeating the reversing of polarities in a pattern preselected based on workpiece material and geometry at a low reversing time frequency in the range of about 1–1000 cycles per second to establish a series of polarity cycles in at least some of which the workpiece surface is positive for a first period of time which is less than a second period of time during which the polarity of the wokpiece surface is negative, whereby a low heat input to the workpiece surface is maintained, and anodic cleaning of the workpiece surface occurs when the polarity of the workpiece surface is positive.

2. The method of claim 1 in which the direct current arc between the electrode and the workpiece surface is maintained during each change of polarity therebetween.

3. The method of claim 2 in which the arc is maintained by restriking.

4. The method of claim 1 in which the workpiece surface is a superalloy based on at least one element selected from the group consisting of Fe, Ni and Co.

5. In a method for depositing a weld bead on a workpiece surface in which a powder is flowed toward and into contact with the workpiece surface while the powder is interacted with a direct electric current plasma transferred arc provided between a non-consumable electrode and the workpiece surface, the steps of:

providing the electrode with a first electric polarity and the workpiece surface with a second electric polarity opposite the first electric polarity in a low electric current range of about 0.5–45 amps while powder is at least partially melted in the arc and deposited on the workpiece surface as a deposit which assumes the polarity of the workpiece surface;

while continuing to flow the powder, reversing the electric polarities between the electrode and the deposit in said electric current range;

again reversing the electric polarities between the electrode and the deposit in said electric current range to provide the electrode with said first electric polarity and the deposit with said second electric polarity opposite said first electric polarity to define a polarity cycle: and, repeating the reversing of polarities in a pattern preselected based on workpiece material and geometry at a low reversing time frequency in the range of about 1–1000 cycles per second to establish a series of polarity cycles in at least some of which the deposit polarity is positive for a first time period which is less than a second time period during which the polarity of the deposit is negative, whereby a low heat input to the deposit is maintained, and anodic cleaning of the deposit occurs when the polarity of the deposit is positive.

6. The method of claim 5 in which the direct electric current arc between the electrode and the deposit is maintained during each change of polarity therebetween.

7. The method of claim 6 in which the direct electric current arc between the electrode and the deposit is interrupted during a change of polarities therebetween, and then is maintained by restriking.

8. The method of claim 5 in which the workpiece surface is a superalloy based on at least one element selected from the group consisting of Fe, Ni and Co.

* * * * *